United States Patent [19]

Harris et al.

[11] Patent Number: 5,832,117

[45] Date of Patent: Nov. 3, 1998

[54] NONLINEAR RESISTIVE NETWORK FOR ISOLATING OUTLIERS IN SENSOR IMAGES

[75] Inventors: John G. Harris, Watertown, Mass.; Bimal P. Mathur, Thousand Oaks; Shih-Chii Liu, Woodland Hills, both of Calif.

[73] Assignee: Rockwell International Corporation, Costa Mesa, Calif.

[21] Appl. No.: 904,768

[22] Filed: Jun. 26, 1992

[51] Int. Cl.[6] ........................................................ G06K 9/64
[52] U.S. Cl. ........................... 382/223; 382/254; 348/241
[58] Field of Search ................................. 382/34, 35, 65, 382/223, 268, 254, 264; 358/213.15, 213.27; 348/241

[56] References Cited

U.S. PATENT DOCUMENTS 5,062,000  10/1991  Harris et al. ........................ 358/213.27
5,218,440   6/1993  Mathur .............................. 358/213.27

OTHER PUBLICATIONS

Harris et al., "Discarding Outliers Using a Nonlinear Resistive Network", Feb. 1, 1991 pp. 501–506.

*Primary Examiner*—Leo Boudreau
*Assistant Examiner*—Christopher Kelley

[57] ABSTRACT

A nonlinear resistive network, which includes switches in the data paths, is provided for identifying, isolating, and/or rejecting outliers in a sensor image. During normal operation, images are received with all the switches in a closed (conducting) state. If the data at a given pixel is different from its immediate neighbors by a predetermined threshold voltage, its switch is opened. A readout of the state of all the switches in the network yields a map of points sources, and a readout of the network voltages yields a noise-free image. Because the threshold voltage can be controlled externally, various strategies may be implemented for identification of the outliers in a computer vision system.

16 Claims, 2 Drawing Sheets

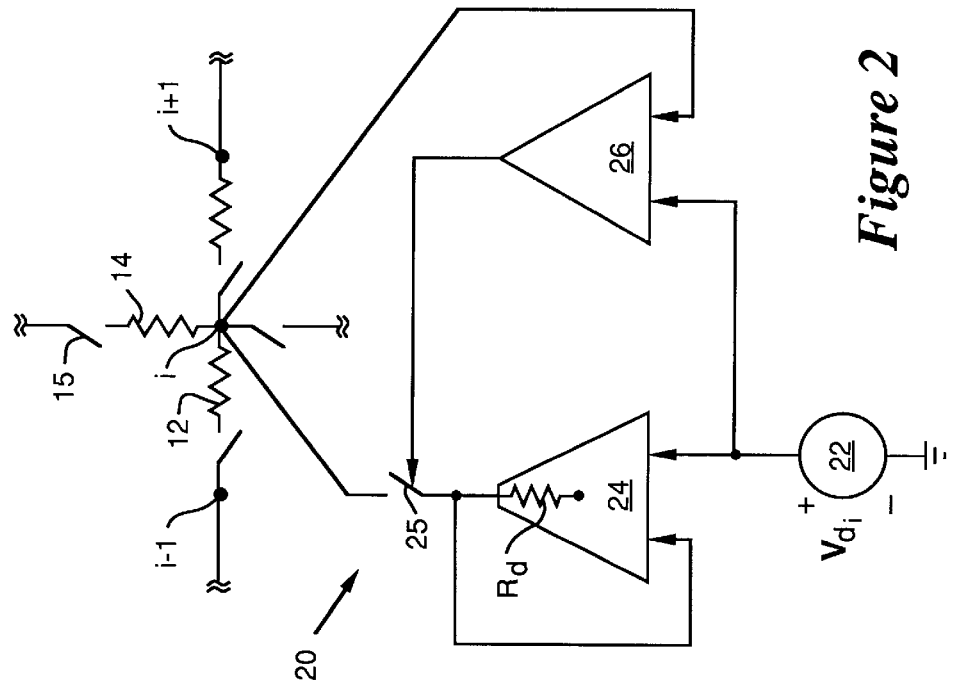
*Figure 2*
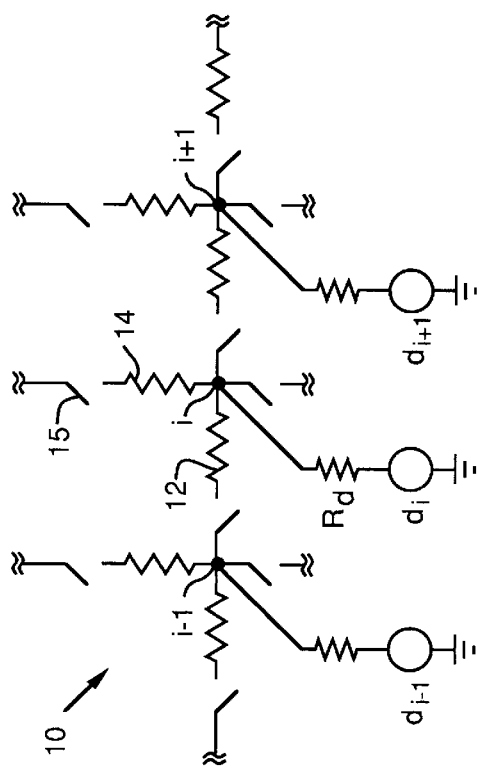
*Figure 1*
Prior Art
*Figure 3*

NONLINEAR RESISTIVE NETWORK FOR ISOLATING OUTLIERS IN SENSOR IMAGES

TECHNICAL FIELD

The present invention relates to sensor imaging systems and, in particular, to a nonlinear resistive network for isolating point targets and noise (outliers) in sensor images.

BACKGROUND OF THE INVENTION

Images collected by man-made sensors, such as infrared focal plane arrays (IRFPAs) and laser radar, for example, generally contain some points or pixels (outliers) that are substantially different from their immediately surrounding pixels. These points may manifest themselves as radar glint or missing data points. Depending on the overall function of the sensor system, outliers may be interest points, such as those produced in the detection of point targets, or noise points, such as those produced by specular reflection from rain drops in laser radar images.

Outliers occur more often in real-world situations than conventional noise models (e.g., the Gaussian noise model) allow. Without elimination of outliers, least squares surface reconstruction algorithms potentially can produce grossly inaccurate solutions. Although outlier rejection techniques have been used in an ad hoc fashion for many years, robust estimation was formalized by P. J. Huber (see Huber, P. J., *Robust Statistics*, John Wiley & Sons, 1981). Huber defines robustness as "insensitivity to small deviation from the assumptions." In the field of image processing, and computer vision in particular, there is a definite need for robust estimation techniques.

In prior image processing systems, identification of outliers is performed using statistical techniques. Statistical methods, however, are computationally intensive and are based on a priori knowledge of the target. When prior assumptions about a target or situation are incorrect, standard statistical methods fail. For example, temporal integration results in blurring of moving targets and spatial smoothing techniques result in blurring of edges. Thus, improved methods are needed because identification of outliers has been difficult to implement in real time image processing systems using known techniques.

SUMMARY OF THE INVENTION

The present invention comprises a nonlinear resistive network for identifying, isolating, and/or rejecting outliers in sensor images. Unlike previous imaging processing networks, the electronic network of the present invention includes switches in the sensor data paths. During normal operation, images are received with all the data switches in a closed (i.e., conducting) state. If the data at a given pixel is very different from its immediate neighbors (i.e., the absolute value of the difference exceeds a predetermined threshold, $V_{th}$), its switch is opened. A readout of the state of all the switches in the network yields a map of point sources, and a readout of the network voltages yields a noise-free image. Because the voltage $V_{th}$ can be controlled externally, various strategies may be implemented for identification of the outliers.

A principal object of the invention is improved image reconstruction through identification of points in sensor images that are substantially different from neighboring points. A feature of the invention is a nonlinear resistive network that includes switches in the sensor data paths. An advantage of the invention is a resistive network and associated method of identifying outliers embodied in an analog, real-time computer processor chip.

BRIEF DESCRIPTION OF THE DRAWINGS

For a more complete understanding of the present invention and for further advantages thereof, the following Detailed Description of the Preferred Embodiment makes reference to the accompanying Drawings, wherein like reference numerals indicate the same or similar elements in the various Figures, in which:

FIG. 1 is a schematic diagram of a resistive smoothing network of prior art design;

FIG. 2 is a schematic diagram of a nonlinear resistive network of the present invention that incorporates a switch in each sensor data path;

FIG. 3 is a graph of the current-voltage characteristics of a nonlinear resistive element of the present invention.

DETAILED DESCRIPTION OF THE PREFERRED EMBODIMENT

Figure 4:
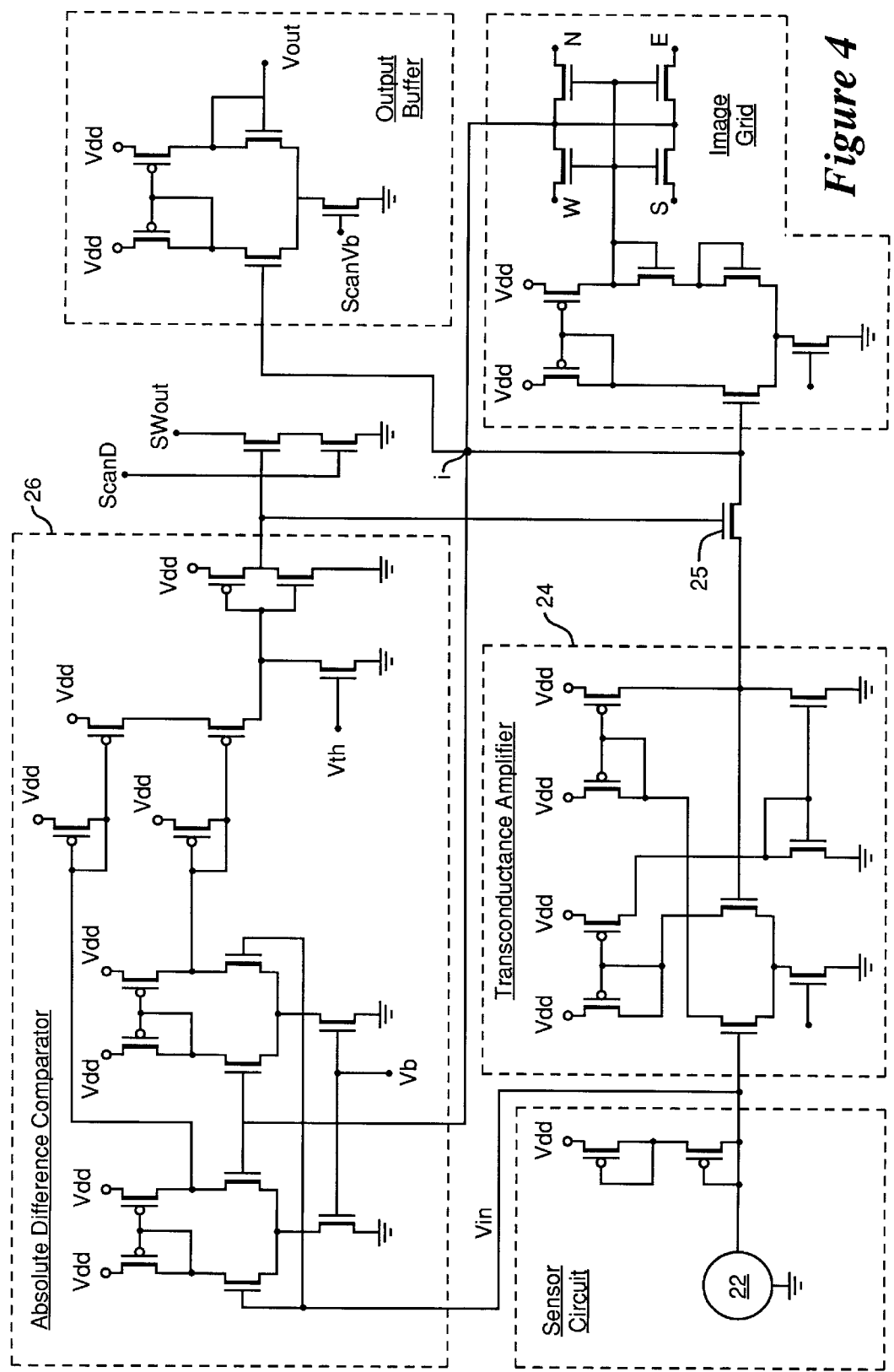
FIG. 4 is a detailed schematic diagram of one embodiment of the nonlinear resistive network of FIG. 2.

The present invention is an electronic system for processing data collected from man-made sensors, such as imaging arrays, millimeter wave radar, and laser radar, that produce images with point targets, missing data points, discontinuities, and/or noise such as glint. The system comprises a nonlinear resistive network for identifying, isolating, and/or rejecting points (outliers) in a sensor image that are substantially different from neighboring points. The resistive network may be implemented as an integrated circuit on a semiconductor chip.

FIG. 1 is a schematic diagram of a typical prior art resistive network 10 used for smoothing sensor images. Network 10 includes a plurality of nodes or pixels, such as nodes i−1, i, and i+1, forming an image plane grid. Each node i is connected to neighboring nodes through a resistive element, such as resistors 12 and 14 that are connected to node i. Each resistive element is connected in series with a switch, such as switch 15 connected to resistor 14. Thus, each node i is connected to its neighboring nodes in the image plane by a resistive element in series with a switch. Each sensor input $d_i$ is connected to its associated node i through a resistive element $R_d$.

Referring to FIG. 2, the nonlinear resistive network 20 of the present invention includes a resistive image plane grid that is similar to that of network 10. However, network 20 also includes a transconductance amplifier 24 (which includes resistive element $R_d$), a switch 25, and an absolute difference comparator 26 connected between each node i and its associated detector input, such as sensor element 22. Network 20 incorporates an energy function that is minimized to reconstruct the surface between sparse data points of synthetic images. In forming the energy function, the sparse and noisy depth data di for each node, or pixel, are provided on the image plane grid. Associated with each node i, or lattice point of the grid, is a value of the recovered surface $u_i$. The energy function to be minimized is given by:

$$E(u, l, m) = \sum_i [(d_i - u_i)^2 (1 - m_i) + \lambda^2 (u_{i+1} - u_i)^2 (1 - l_i) + \alpha l_i + \beta m_i],$$

where $\lambda$ is a smoothing parameter, $l_i$ represents discontinuities in the surface u, $m_i$ represents outliers in the data, $\alpha$ is a cost factor for breaking a line discontinuity $l_i$, and $\beta$ is a cost factor for breaking an outlier $m_i$. The values of $\lambda$, $\alpha$, and $\beta$ are set with knowledge, for example, of the amount of noise in the image, the minimum detectable contrast ratio, and/or the minimum distance between outliers and the surface. The system of the present invention may also include mechanisms for automatically setting these parameters.

The first term of the energy function above causes the surface u to be close to the measured data d. The second term enforces a piece-wise smoothness constraint with the smoothing parameter $\lambda$. If it is assumed that $m_i=0$ everywhere (i.e., no outliers), the energy function above is reduced to the prior art line process energy function used by other researchers and embodied in the resistive network illustrated in FIG. 1. In the above equation, if all variables, except for $u_i$, $u_{i+1}$, and $l_i$, are held constant and $\lambda^2(u_{i+1}-u_i)^2<\alpha$, then it is cost effective to pay the price $\lambda^2(u_{i+1}-u_i)^2$ and set $l_i=0$ instead of paying the larger price $\alpha$. If the gradient becomes too steep, $l_i$ is set to 1, and the surface is segmented at that location. Thus, when $l_i=1$, a line discontinuity exists at the $i^{th}$ pixel.

In the present invention, the $m_i$ term is included in the energy function to allow for rejection of outliers. Thus, if $(d_i-u_i)^2<\beta$, it is cheaper to pay the price $(d_i-u_i)^2$ and set $m_i=0$ than to pay the larger price $\beta$. However, if $(d_i-u_i)^2>\beta$, it is cheaper to pay the price $\beta$ and set $m_i=1$. When this occurs, the data $d_i$ is isolated from the network and plays no part in the final image solution.

The energy minimization problem stated above is solved by mapping the energy function onto nonlinear resistive network 20 of the present invention illustrated in FIG. 2. The stationary voltage at every grid point (i) then corresponds to $u_i$. A voltage source proportional to the data $d_i$ is applied to every node of the network. The nominal conductance between the voltage source and the grid is assumed to be 1. In the absence of discontinuities (i.e., all $l_i=0$) and outliers (i.e., all $m_i=0$), smoothness is implemented by a conductance of value $\lambda^2$ connecting neighboring grid points. Thus, the resistive elements of the network can be considered linear resistors under these conditions. The cost function for the system can be interpreted as the power dissipated by the network. If parasitic capacitance is added to the circuit, the cost function acts as a Lyapunov function of the system, and the stationary voltage distribution corresponds to the smooth surface.

In operation, network 20 breaks one of the image plane resistive elements (i.e., sets $l_i=1$) wherever a discontinuity occurs and breaks one of the data path resistive elements (i.e., sets $m_i=1$) wherever an outlier occurs. Each image plane resistive element may comprise a resistive fuse or a saturating nonlinear resistor, for example. For a resistive fuse, the current decreases to zero for increasing values of the voltage drop across the device. For a saturating nonlinear resistor, the current saturates for increasing values of the voltage drop. As illustrated in FIG. 2, the nonlinear resistive element in the data path comprises transconductance amplifier 24 and switch 25. Connected in series, transconductance amplifier 24 and switch 25 have a nonlinear, sigmoid-like I–V characteristic bounded by the operation of switch 25, as illustrated graphically in FIG. 3.

The operation of switch 25 is controlled by the absolute difference comparator 26. Initially, all switches are closed and the network smoothes the input data values from all the sensor elements. Comparator 26 then computes the absolute difference between the input data value $d_i$ and the smoothed data value at node i. If the absolute difference is greater than a threshold value (i.e., greater than $V_{th}$), then the data value at node i is an outlier and switch 25 is opened. As a result, the image data at node i is smoothed without input from sensor element 22. Thus, the remaining data at the image plane is smoothed after rejection of all outliers. The position of an outlier, which is important in the detection of point targets, is indicated by the position of an open switch, such as switch 25, in network 20.

An embodiment of nonlinear resistive network 20 is illustrated in greater detail in FIG. 4. Sensor element 22, transconductance amplifier 24, switch 25, absolute difference comparator 26, and the image grid, indicated within respective dotted line boxes, correspond to the same elements illustrated in network 20 of FIG. 2. The embodiment of FIG. 4 utilizes field effect transistors suitable for production as an integrated circuit on a semiconductor chip.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. An electronic circuit for isolating outliers in a sensor image, comprising:
   a plurality of sensor inputs;
   a smoothing network having a plurality of nodes corresponding to said plurality of sensor inputs, each of said nodes connected to neighboring ones of said nodes for providing smoothed data values on said nodes;
   means for connecting each of said sensor inputs to a corresponding one of said network nodes; and
   means for disconnecting each of said sensor inputs from its corresponding node when said sensor input differs by a predetermined amount from said smoothed data value on said corresponding node.

2. The circuit of claim 1, wherein each of said connecting means comprises a resistive element and a comparator connected between said sensor input and said corresponding node.

3. The circuit of claim 2, wherein said resistive element comprises a transconductance amplifier.

4. The circuit of claim 3, wherein each of said comparators computes an absolute difference between its corresponding sensor input and said smoothed data value on said corresponding node.

5. The circuit of claim 4, wherein said disconnecting means comprises a plurality of switches, each of said switches connected in series with a corresponding one of said transconductance amplifiers between one of said sensor inputs and its corresponding node, the operation of each of said switches controlled by said corresponding comparator.

6. An electronic circuit for isolating outliers in a sensor image, comprising:
   a resistive network having a plurality of nodes forming an image plane grid, each of said nodes connected by image plane resistive elements to neighboring nodes of said grid for providing smoothed data values on said nodes;
   a plurality of sensor inputs and a corresponding plurality of data paths, each of said data paths connecting one of said sensor inputs to a corresponding one of said nodes; and
   each of said data paths comprising a data path resistive element, a comparator, and a switch.

7. The electronic circuit of claim 6, wherein said data path resistive element comprises a transconductance amplifier.

8. The electronic circuit of claim 7, wherein said comparator computes an absolute difference between its corresponding sensor input and said smoothed data value on said corresponding node.

9. The electronic circuit of claim 8, wherein said comparator is connected to said switch for opening said switch when said computed absolute difference exceeds a predetermined threshold value.

10. The electronic circuit of claim 9, wherein said transconductance amplifier, said comparator, and said switch are connected to form a nonlinear resistive element having a sigmoid shaped I–V characteristic, and wherein current through said nonlinear resistive element falls to zero when its voltage drop exceeds said predetermined threshold value.

11. The electronic circuit of claim 10, further comprising means for indicating location of said open switch, thereby indicating location of an outlier in the sensor image.

12. A nonlinear resistive network for isolating outliers in a sensor image having a plurality of data points, comprising:

a plurality of nodes forming an image plane, each of said nodes connected to neighboring nodes by image smoothing resistive elements;

a plurality of sensor inputs on a corresponding plurality of data paths, each of said data paths connecting one of said sensor inputs to a corresponding one of said nodes;

each of said data paths comprising a corresponding transconductance amplifier, a corresponding switch, and a corresponding comparator; and said corresponding transconductance amplifier and switch connected in series in said data path and said corresponding comparator connected to control said corresponding switch.

13. The nonlinear resistive network of claim 12, wherein said smoothing resistive elements provide a smoothed value on each of said nodes, and wherein said comparator in each of said data paths comprises a plurality of field effect transistors connected to compute an absolute difference between said corresponding sensor input and said smoothed value on said corresponding node.

14. The nonlinear resistive network of claim 13, wherein said comparator in each of said data paths opens said corresponding switch when said computed absolute difference exceeds a predetermined threshold value.

15. The nonlinear resistive network of claim 14, wherein said corresponding transconductance amplifier, comparator, and switch in each of said data paths form a nonlinear resistive element having a sigmoid shaped I–V characteristic, and wherein current through said nonlinear resistive element falls to zero upon opening of said switch when the voltage drop across said nonlinear resistive element exceeds said predetermined threshold value.

16. The nonlinear resistive network of claim 15, further comprising means for indicating location of said open switches with respect to said image plane, thereby indicating location of the outliers in the sensor image.

* * * * *